(12) United States Patent
Lockley et al.

(10) Patent No.: US 7,125,953 B2
(45) Date of Patent: Oct. 24, 2006

(54) ION-CONDUCTING POLYMERIC MATERIALS

(75) Inventors: John Edward Lockley, Lancaster (GB); Brian Wilson, Lancashire (GB)

(73) Assignee: Victrex Manufacturing Limited, Lancashire (GB)

( * ) Notice: Subject to any disclaimer, the term of this patent is extended or adjusted under 35 U.S.C. 154(b) by 0 days.

(21) Appl. No.: 10/486,644

(22) PCT Filed: Sep. 18, 2002

(86) PCT No.: PCT/GB02/04250

§ 371 (c)(1),
(2), (4) Date: Apr. 28, 2004

(87) PCT Pub. No.: WO03/028140

PCT Pub. Date: Apr. 3, 2003

(65) Prior Publication Data

US 2004/0214063 A1 Oct. 28, 2004

(30) Foreign Application Priority Data

Sep. 26, 2001 (GB) ................................ 0123135.6

(51) Int. Cl.
*C08F 6/00* (2006.01)
(52) U.S. Cl. ...................... 528/480; 525/328; 525/344; 525/471; 528/125; 528/171; 528/174
(58) Field of Classification Search ................ 525/328, 525/344, 471; 528/125, 171, 174, 480
See application file for complete search history.

(56) References Cited

U.S. PATENT DOCUMENTS

| 4,990,252 | A | 2/1991 | Testa et al. |
| 5,795,496 | A | 8/1998 | Graham et al. |
| 6,613,106 | B1 * | 9/2003 | Debe et al. ................. 29/623.3 |
| 6,828,353 | B1 * | 12/2004 | Charnock et al. ............. 521/27 |

FOREIGN PATENT DOCUMENTS

| EP | 0 182 506 B1 | 3/1991 |
| WO | WO 98/52732 A | 11/1998 |
| WO | WO 00/15691 A | 3/2000 |

* cited by examiner

*Primary Examiner*—Terressa Boykin
(74) *Attorney, Agent, or Firm*—Nixon & Vanderhye

(57) ABSTRACT

A method of preparing an ion-conducting polymeric material, for example, for a fuel cell, in a desired form (hereinafter "said formed polymeric material"), comprises: (i) selecting a first ion-conducting polymeric material; (ii) selecting a solvent formulation which can dissolve said first ion-conducting polymeric material, wherein said formulation includes a first solvent part which is water; (iii) preparing a composite formulation in a process which includes dissolving first ion-conducting polymeric material in said solvent formulation; (iv) forming said composite formulation into a desired form; (v) providing conditions for removal of said solvent formulation from said form described in (iv) thereby to prepare said formed polymeric material. The first ion-conducting polymeric material preferably includes polyaryletherketone units. Said solvent formulation preferably includes a second solvent part selected from acetone, tetrahydrofuran and acetone.

19 Claims, 1 Drawing Sheet

ION-CONDUCTING POLYMERIC MATERIALS

Figure 1:
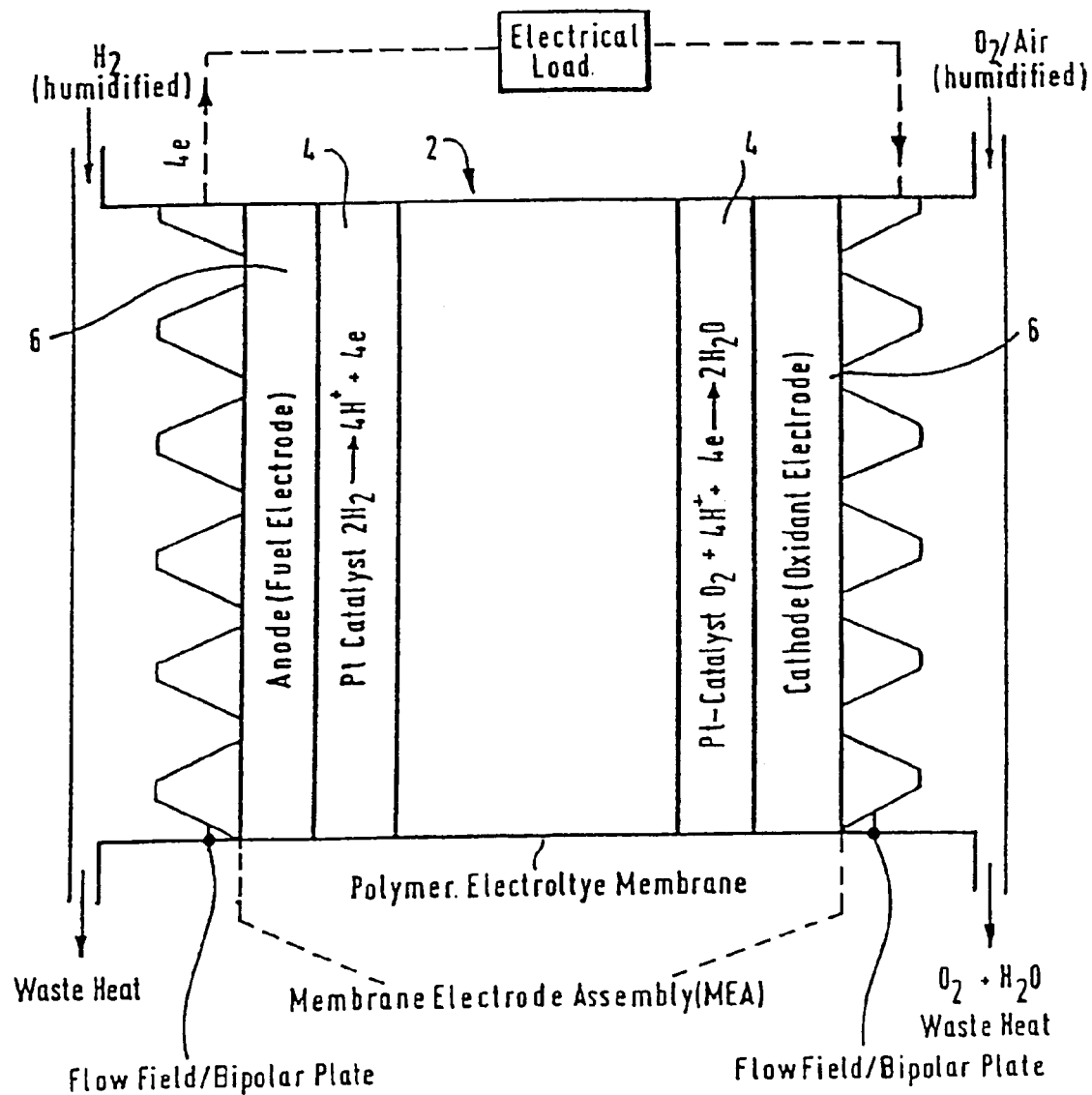

This application is the U.S. National Phase of International Application PCT/GB02/04250, filed 18 Sep. 2002, which designated the U.S.

This invention relates to ion-conducting polymeric materials and particularly, although not exclusively, relates to a method of preparing such materials. Preferred embodiments relate to the preparation of crystalline ion-conducting polymeric materials for fuel cells, for example polymer electrolyte membranes thereof.

One type of polymer electrolyte membrane fuel cell (PEMFC), shown schematically in FIG. 1 of the accompanying diagrammatic drawings, may comprise a thin sheet 2 of a hydrogen-ion conducting Polymer Electrolyte Membrane (PEM) sandwiched on both sides by a layer 4 of platinum catalyst and an electrode 6. The layers 2, 4, 6 make up a Membrane Electrode Assembly (MEA) of less than 1 mm thickness.

In a PEMFC, hydrogen is introduced at the anode (fuel electrode) which results in the following electrochemical reaction:

Pt-Anode (Fuel Electrode) $2H_2 \rightarrow 4H^+ + 4e^-$

The hydrogen ions migrate through the conducting PEM to the cathode. Simultaneously, an oxidant is introduced at the cathode (oxidant electrode) where the following electrochemical reaction takes place:

Pt-Cathode (Oxidant Electrode) $O_2 + 4H^+ + 4e^- \rightarrow 2H_2O$

Thus, electrons and protons are consumed to produce water and heat. Connecting the two electrodes through an external circuit causes an electrical current to flow in the circuit and withdraw electrical power from the cell.

Preferred ion-conducting polymeric materials for use as components of polymer electrolyte membranes in fuel cells have high conductivity (low EW, or high ion-exchange capacities), optimum water uptake for good conductivity and mechanical properties and solubility in solvents which can be used to cast the membranes.

Examples of known ion-conducting polymeric materials are described in U.S. Pat. No. 5,985,477 (Sumitomo) and U.S. Pat. No. 5,906,716 (Hoechst). The polyaryletherketones and/or sulphones described are dissolved in a solvent, usually N-methylpyrrolidone (NMP), and are then cast to prepare membranes. It should be noted that the polymer initially dissolved in the solvent is the same, in terms of its physical and/or chemical properties, both before and after casting—casting is used only to form the polymer into a predetermined, desired shape, for example a thin membrane.

Whilst NMP is a very good solvent for casting membranes from a wide range of materials, membranes cast from NMP (especially polymer electrolyte membranes of fuel cells) can have defects and/or exhibit problems in downstream process steps. Thus, a first object of a first embodiment of the present invention is to address problems associated with the use of NMP as a solvent for casting membranes.

A second object of the present invention is to provide an improved process for the preparation of polymeric materials in a desired form, particularly ion-conducting polymeric materials, for example for polymer electrolyte membranes and/or gas diffusion electrodes.

According to a first aspect of the invention, there is provided a method of preparing an ion-conducting polymeric material in a desired form (hereinafter "said formed polymeric material"), the method comprising:

(i) selecting a first ion-conducting polymeric material;
(ii) selecting a solvent formulation which can dissolve said first ion-conducting polymeric material, wherein said formulation includes a first solvent part which is water;
(iii) preparing a composite formulation in a process which includes dissolving first ion-conducting polymeric material in said solvent formulation;
(iv) forming said composite formulation into a desired form;
(v) providing conditions for removal of said solvent formulation from said form described in (iv) thereby to prepare said formed polymeric material.

Unless otherwise stated in this specification, a phenyl moiety may have 1,4- or 1,3-, especially 1,4-, linkages to moieties to which it is bonded.

Said solvent formulation in which said first ion-conducting polymeric material is dissolved preferably includes a second solvent part. Said second solvent part is preferably an organic solvent. Said second solvent part preferably has a boiling point at atmospheric pressure of greater than −30° C., preferably greater than 0° C., more preferably greater than 10° C., especially greater than 20° C. The boiling point may be less than 200° C., preferably less than 150° C., especially less than 120° C. Said second solvent part is preferably able to form a dipole-dipole interaction with the first polymeric material. In this regard, the first polymeric material suitably acts as a soft Lewis base and the second solvent part may then act as a Lewis acid. Said second solvent part may include a ketone, ether or haloalkyl (especially chloro- or fluoroalkyl) group or an unsaturated ring structure. Said second solvent part preferably includes less than eight, preferably less than seven, carbon atoms. Where said second solvent part includes a ketone, ether or haloalkyl group, said second solvent part may include less than six carbon atoms. Said second solvent part may be aliphatic. For example, it may be an alkylhalide, ketone or amide solvent. Alternatively, said second solvent part may be a non-aromatic cyclic solvent. For example it may be a cyclic ether or cyclic ketone solvent. Said second solvent part may be aromatic, for example it may be an optionally-substituted, especially an optionally monosubstituted, benzene. Said second solvent part is preferably aprotic. It may be a polar aprotic solvent. Said second solvent part may be selected from benzene, toluene, dichloromethane, tetrahydrofuran, cyclopentanone, acetone, 1,3-dichloropropane, chlorobenzene, tetrafluoroethane, diethylketone, methylethyl ketone, cyclohexanone and ethylbenzene. Preferred such solvents include acetone, tetrahydrofuran (THF) and dichloromethane. Of the aforesaid, acetone may be especially preferred.

Said first polymeric material suitably has a solubility of at least 2% w/w, preferably at least 4% w/w, more preferably at least 7.5% w/w, in said solvent formulation at the boiling point of said solvent formulation.

Suitably, in the method, at least 2% w/w, preferably at least 4% w/w, more preferably at least 7.5% w/w of said first polymeric material is dissolved in said solvent formulation.

Suitably, in the method, the total amount of polymeric materials (including said first polymeric material and any polymeric material blended therewith) dissolved in said solvent formulation is at least 2% w/w, preferably at least 5% w/w, more preferably at least 7.5% w/w. The total amount may be 30% w/w or less.

In the method, said composite formulation may be formed into a desired form (e.g. cast) at a temperature at or below the boiling point of said solvent formulation.

A preferred first ion-conducting polymeric material is one having a moiety of formula

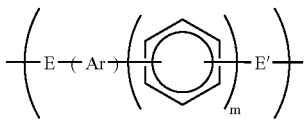
(I)

and/or a moiety of formula

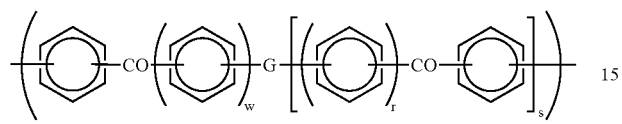
(II)

and/or a moiety of formula

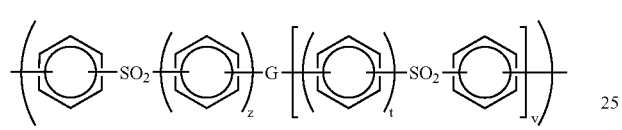
(III)

wherein at least some of the units I, II and/or III are funtionalized to provide ion-exchange sites, wherein the phenyl moieties in units I, II, and III are independently optionally substituted and optionally cross-linked; and wherein m,r,s,t,v,w and z independently represent zero or a positive integer, E and E' independently represent an oxygen or a sulphur atom or a direct link, G represents an oxygen or sulphur atom, a direct link or a —O-Ph-O— moiety where Ph represents a phenyl group and Ar is selected from one of the following moieties (i)* or (i) to (x) which is bonded via one or more of its phenyl moieties to adjacent moieties

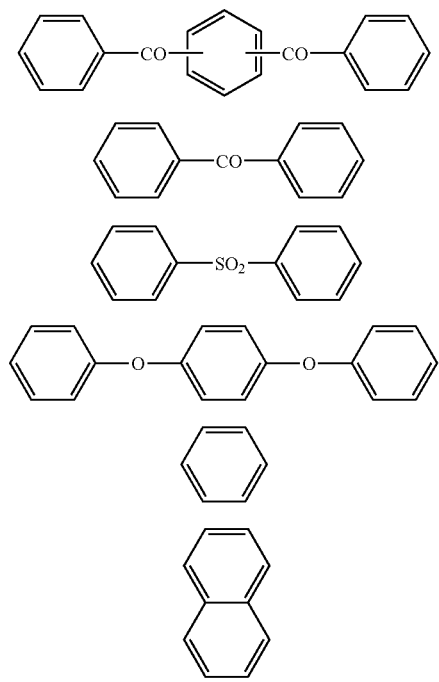

(i)*

(i)

(ii)

(iii)

(iv)

(v)

-continued

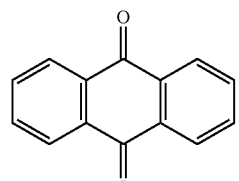
(vi)

(vii)

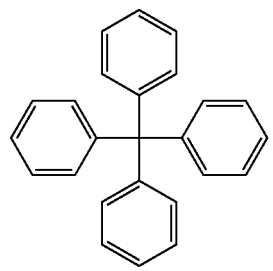
(viii)

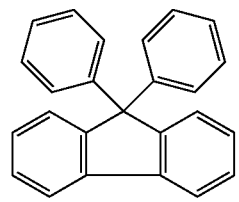
(ix)

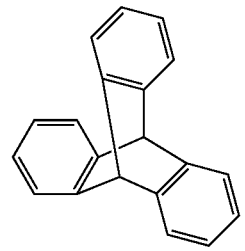
(x)

In (i)*, the middle phenyl may be 1,4- or 1,3-substituted.

Suitably, to provide said ion exchange sites, said s polymeric material is sulphonated, phosphorylated, carboxylated, quaternary-aminoalkylated or chloromethylated, and optionally further modified to yield —$CH_2PO_3H_2$, —$CH_2NR_3^{20+}$ where $R^{20}$ is an alkyl, or —$CH_2NAr_3^{x+}$ where $Ar^x$ is an aromatic (arene), to provide a cation or anion exchange membrane. Further still, the aromatic moiety may contain a hydroxyl group which can be readily elaborated by existing methods to generate —$OSO_3H$ and —$OPO_3H_2$ cationic exchange sites on the polymer. Ion exchange sites of the type stated may be provided as described in WO95/08581.

Preferably, said first material is sulphonated. Preferably, the only ion-exchange sites of said first material are sites which are sulphonated.

References to sulphonation include a reference to substitution with a group —$SO_3M$ wherein M stands for one or more elements selected with due consideration to ionic valencies from the following group: H, $NR_4^{y+}$, in which $R^y$ stands for H, $C_1$–$C_4$ alkyl, or an alkali or alkaline earth metal or a metal of sub-group 8, preferably H, $NR_4^+$, Na, K, Ca, Mg, Fe, and Pt. Preferably M represents H. Sulphonation of the type stated may be provided as described in WO96/29360.

Said first polymeric material may include more than one different type of repeat unit of formula I; more than one different type of repeat unit of formula II; and more than one different type of repeat unit of formula III.

Said moieties I, II and III are suitably repeat units. In the first polymeric material, units I, II and/or III are suitably bonded to one another—that is, with no other atoms or groups being bonded between units I, II, and III.

Where the phenyl moieties in units I, II or III are optionally substituted, they may be optionally substituted by one or more halogen, especially fluorine and chlorine, atoms or alkyl, cycloalkyl or phenyl groups. Preferred alkyl groups are $C_{1-10}$, especially $C_{1-4}$, alkyl groups. Preferred cycloalkyl groups include cyclohexyl and multicyclic groups, for example adamantyl. In some cases, the optional substituents may be used in the cross-linking of the polymer. For example, hydrocarbon optional substituents may be functionalised, for example sulphonated, to allow a cross-linking reaction to take place. Preferably, said phenyl moieties are unsubstituted.

Another group of optional substituents of the phenyl moieties in units I, II or III include alkyls, halogens, $C_yF_{2y+1}$ where y is an integer greater than zero, O—$R^q$ (where $R^q$ is selected from the group consisting of alkyls, perfluoralkyls and aryls), $CF=CF_2$, CN, $NO_2$ and OH. Trifluormethylated phenyl moieties may be preferred in some circumstances.

Where said first polymeric material is cross-linked, it is suitably cross-linked so as to improve its properties as a polymer electrolyte membrane, for example to reduce its swellability in water. Any suitable means may be used to effect cross-linking. For example, where E represents a sulphur atom, cross-linking between polymer chains may be effected via sulphur atoms on respective chains. Alternatively, said polymer may be cross-linked via sulphonamide bridges as described in U.S. Pat. No. 5,561,202. A further alternative is to effect cross-linking as described in EP-A-0008895.

Where w and/or z is/are greater than zero, the respective phenylene moieties may independently have 1,4- or 1,3-linkages to the other moieties in the repeat units of formulae II and/or III. Preferably, said phenylene moieties have 1,4-linkages.

Preferably, the polymeric chain of the first material does not include a —S— moiety. Preferably, G represents a direct link.

Suitably, "a" represents the mole % of units of formula I in said first polymeric material, suitably wherein each unit I is the same; "b" represents the mole % of units of formula II in said material, suitably wherein each unit II is the same; and "c" represents the mole % of units of formula III in said material, suitably wherein each unit III is the same. Preferably, a is in the range 45–100, more preferably in the range 45–55, especially in the range 48–52. Preferably, the sum of b and c is in the range 0–55, more preferably in the range 45–55, especially in the range 48–52. Preferably, the ratio of a to the sum of b and c is in the range 0.9 to 1.1 and, more preferably, is about 1. Suitably, the sum of a, b and c is at least 90, preferably at least 95, more preferably at least 99, especially about 100. Preferably, said first polymeric material consists essentially of moieties I, II and/or III.

Said first polymeric material may be a homopolymer having a repeat unit of general formula

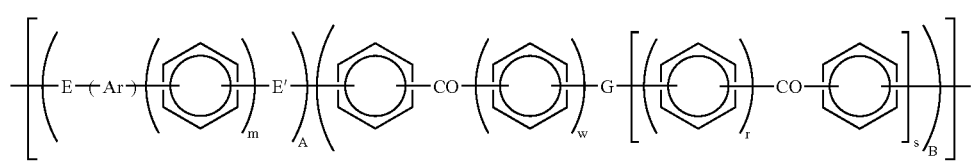

or a homopolymer having a repeat unit of general formula

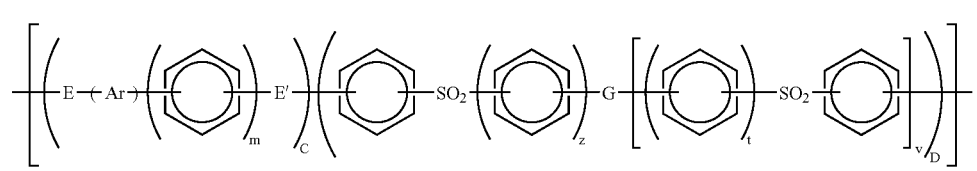

or a random or block copolymer of at least two different units of IV and/or V provided that repeat units (or parts of repeat unit) are functionalised to provide ion-exchange sites;

wherein A, B, C and D independently represent 0 or 1 and E,E',G,Ar,m,r,s,t,v,w and z are as described in any statement herein.

As an alternative to a polymer comprising units IV and/or V discussed above, said first polymeric material may be a homopolymer having a repeat unit of general formula

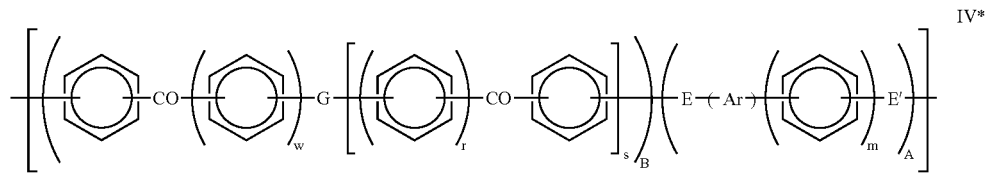

or a homopolymer having a repeat unit of general formula

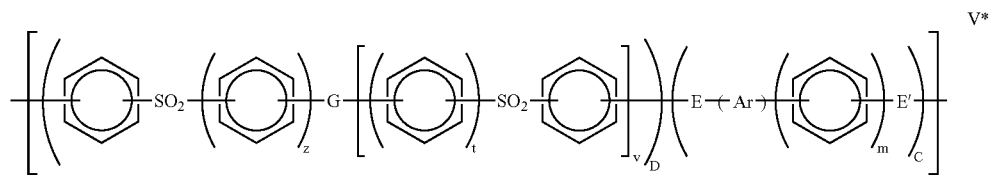

or a random or block copolymer of at least two different units of IV* and/or V* provided that repeat units (or parts of repeat units) are functionalised to provide ion-exchange sites; wherein A, B, C, and D independently represent 0 or 1 S and E, E', G, Ar, m, r, s, t, v, w and z are as described in any statement herein.

Preferably, m is in the range 0–3, more preferably 0–2, especially 0–1. Preferably, r is in the range 0–3, more preferably 0–2, especially 0–1. Preferably t is in the range 0–3, more preferably 0–2, especially 0–1. Preferably, s is 0 or 1. Preferably v is 0 or 1. Preferably, w is 0 or 1. Preferably z is 0 or 1.

Preferably Ar is selected from the following moieties: (xi)* and (xi) to (xxi):

(xi)*

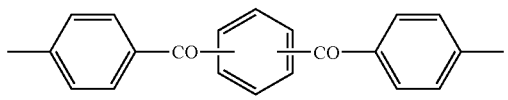

(xi)

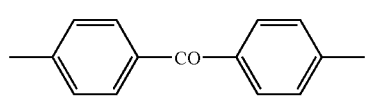

(xii)

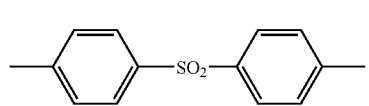

(xiii)

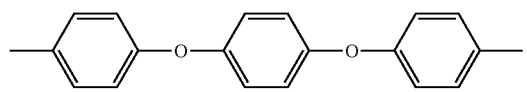

(xiv)

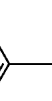

-continued (xv)

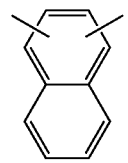

(xvi)

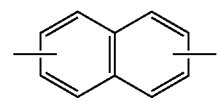

(xvii)

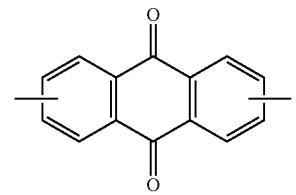

(xviii)

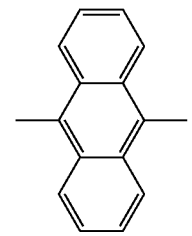

(xix)

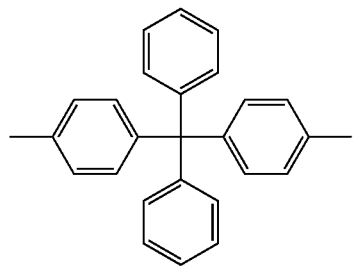

-continued

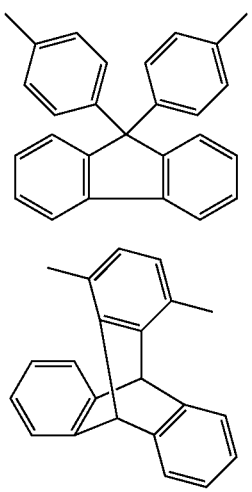

(xx)

(xxi)

In (xi)*, the middle phenyl may be 1,4- or 1,3-substituted.

Preferably, (xv) is selected from a 1,2-, 1,3-, or a 1,5-moiety; (xvi) is selected from a 1,6-, 2,3-, 2,6- or a 2,7-moiety; and (xvii) is selected from a 1,2-, 1,4-, 1,5-, 1,8- or a 2,6-moiety.

Preferably, said first ion-conducting polymeric material is crystalline or crystallisable.

Unless otherwise stated in this specification, a reference to a crystalline material extends to any material having at least some crystallinity.

The existence and/or extent of crystallinity in a polymer is preferably measured by wide angle X-ray diffraction, for example as described by Blundell and Osborn (Polymer 24, 953, 1983). Alternatively, Differential Scanning Calorimetry (DSC) could be used to assess crystallinity. The level of crystallinity in said first polymeric material may be 0% (e.g. where the material is amorphous or crystallisable); or the level of crystallinity may be at least 0.5%, suitably at least 1%, preferably at least 5% weight fraction, suitably when measured as described by Blundell and Osborn. The level of crystallinity in said first polymeric material may be less than 20%.

In a preferred embodiment, said first ion-conducting polymeric material is crystalline or crystallisable and a solvent formulation is selected in step (ii) which can dissolve said first polymeric material and increase its crystallinity. In this case, it is possible to adjust advantageously the properties of polymeric materials for ion-conducting membranes by selection of appropriate casting solvents thereby to produce membranes having improved properties compared to the materials when cast using processes described in the prior art. Furthermore, the improvement in properties can be achieved without any additional treatment step compared to known processes.

The difference between the level of crystallinity (%), suitably measured as described above, in said formed polymeric material and the level of crystallinity (%) in said first ion-conducting polymeric material prior to dissolution in said solvent formulation is suitably at least 0.1%, preferably at least 0.3%, more preferably at least 0.4%, especially at least 0.5%. In some cases, the difference may be 1%, 2% or even 5%.

The difference between the level of crystallinity (%) in said formed polymeric material and the level of crystallinity (%) of material formed in identical fashion to that of said formed material except that a solvent formulation, for example comprising NMP, is used which whilst capable of dissolving said first polymeric material is not capable of increasing its crystallinity, may be at least 0.1%, preferably at least 0.4%, more preferably at least 1%, especially at least 3%.

The difference between the sensitivity (or water uptake) (%) of said formed polymeric material compared to that of a material formed in an identical fashion to that of said formed material except that a solvent formulation, for example NMP, is used which whilst capable of dissolving said first polymeric material is not capable of increasing its crystallinity may be at least 20%, preferably at least 40%, more preferably at least 60%, especially at least 80%.

When said first polymeric material has at least some crystallinity or is crystallisable, the material may be made up of a number of repeat units, some of which may be crystallisable or have some crystallinity and some of which may be amorphous. For example, repeat units provided with ion-exchange sites, for example sulphonate groups, will tend to be amorphous, as will repeat units which include bulky groups or —SO$_2$—. Repeat units which are crystalline or crystallisable suitably include moieties which can be exchanged with ether units in a polyetherketone crystal lattice. Ketone units and/or —S— units may be exchanged and may, therefore, be components of crystalline or crystallisable units.

Said first ion-conducting polymeric material preferably includes a first crystalline or crystallisable repeat unit which suitably includes phenyl moieties linked by —CO— and/or -Q- groups, where Q represents —O— or —S—, but does not include —SO$_2$— and/or any groups whose shape and/or conformation is/are incompatible with the crystalline conformation adopted by polyetherketone units. Said first polymeric material may additionally include a second ion-conducting repeat unit having phenyl moieties; carbonyl or sulphone moieties; and ether or thioether moieties in the polymer backbone. Such a unit may be functionalised to provide ion-exchange sites and will, therefore, suitably be amorphous. Optionally, said first polymeric material may include a third amorphous repeat unit which is not functionalised to provide ion-exchange sites but is amorphous. Said third repeat unit may include —SO$_2$— and/or any groups whose shape and/or conformation is/are incompatible with the crystalline conformation adopted by polyetherketone units.

A said first crystalline or crystallisable ion-conducting polymeric material may includes moieties I, II and/or III described above, provided said material includes crystalline or crystallisable units. Said first polymeric material may be a homopolymer or copolymer which includes units IV, V, IV*, V* as described above, provided that respective repeat units (or parts of repeat units) of said material are crystalline or crystallisable and other repeat units (or parts of repeat units) are functionalised to provide ion-exchange sites.

Said first ion-conducting polymeric material may include:
a said first crystalline or crystallisable unit which is of general formula IV, IV*, V or V* as described above, provided said unit is crystalline or crystallisable. Suitably, to be crystalline or crystallisable, said first unit does not include any Ar group of formula (ii), (viii), (ix) or (x). More preferably, it may also not include an Ar group of formula (v), (vi) or (vii). Preferred Ar groups consist of one or more phenyl groups optionally in combination with one or more carbonyl and/or ether groups.

a said second ion-exchange unit of formula IV, V, IV* or V* as described above, wherein said ion-exchange unit includes ion-exchange sites.

a said third amorphous unit which is of general formula IV, IV*, V or V*, provided, however, that said unit includes at least some moieties whose shape and/or conformation is/are incompatible with the crystalline conformation of said first crystalline unit so that said third unit is amorphous. Preferably, said third unit includes an —$SO_2$— moiety, a bulky group and/or a moiety of formula -Q-Z-Q- wherein Z represents an aromatic group containing moiety and Q is as described above, wherein said unit of formula -Q-Z-Q- is not symmetrical about an imaginary line which passes through the two -Q- moieties provided, however, that said unit is not derived from dihydroxybenzophenone substituted by groups Q at the 4- and 4'-positions (since such a benzophenone acts in the manner of a symmetrical moiety by virtue of the carbonyl group being substantially similar to an ether group thereby allowing the carbonyl group to be interchanged with an ether group in a polyaryletherketone crystal lattic).

Examples of units of formula -Q-Z-Q- (especially wherein Q is —O—) are as follows:

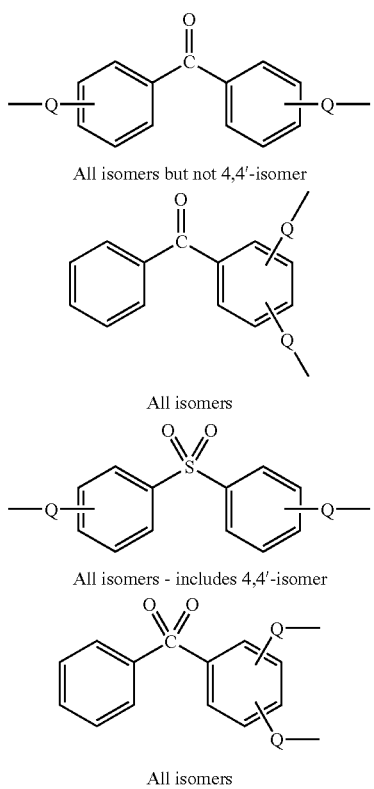

One preferred class of first polymeric materials may include at least some ketone moieties in the polymeric chain. In such a preferred class, the polymer preferably does not only include —O— and —$SO_2$— moieties between aryl (or other unsaturated) moieties in the polymeric chain. Thus, in this case, suitably, a polymer of the first aspect does not consist only of moieties of formula III, but also includes moieties of formula I and/or II.

One preferred class of first polymeric materials does not include any moieties of formula III, but suitably only includes moieties of formulae I and/or II. Where said first polymeric material is a homopolymer or random or block copolymer as described, said homopolymer or copolymer suitably includes a repeat unit of general formula IV. Such a polymer may, in some embodiments, not include any repeat unit of general formula V.

Suitable moieties Ar are moieties (i)*, (i), (ii), (iv) and (v) and, of these, moieties (i)*, (i), (ii) and (iv) are preferred. Preferred moieties. Ar are moieties (xi)*, (xi), (xii), (xiv), (xv) and (xvi) and, of these, moieties (xi)*, (xi), (xii) and (xiv) are especially preferred. Another preferred moiety is moiety (v), especially, moiety (xvi). In relation, in particular to the alternative first polymeric materials comprising units IV* and/or V*, preferred Ar moieties are (v) and, especially, (xvi).

Said first crystalline or crystallisable unit preferably only includes phenyl groups linked by —CO— and —O—.

Said second ion-exchange unit preferably includes a unit which, prior to functionalisation with ion-exchange sites (e.g. prior to sulphonation), is electron-rich and relatively non-deactivated. Examples include -Q-phenyl-Q-, -Q-biphenyl-Q- and -Q-naphthalene-Q- where Q represents an oxygen or sulphur atom, especially an oxygen atom. Such units can be provided with ion-exchange sites (e.g. sulphonated) under relatively mild conditions as described in the examples hereinafter. Under the same conditions the first units are not provided with ion-exchange sites (e.g. sulphonated). Thus, suitably, up to 100 mole % of phenyl groups in said second ion-exchange unit are sulphonated.

Said optional third unit preferably includes phenyl groups linked by —CO, —$SO_2$—, —O— and/or —S— provided said third unit is not provided with ion-exchange sites (e.g. sulphonated) under the relatively mild conditions under which said second unit is functionalised (i.e. said third unit is less easy to provide with ion-exchange sites compared to said second unit prior to its functionalisation as described) and provided said third unit is amorphous.

Said first crystalline or crystallisable unit described above may comprise phenyl groups linked by ether and ketone groups. Said unit may be a repeat unit of formula

XVI

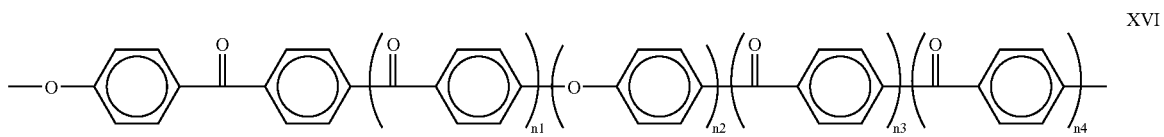

wherein n1, n2, n3 and n4 independently represent 0 or 1 provided that the sum of n1, n2, n3 and n4 is at least 2 and that when n2 is 1 at least one of n3 and n4 is 1. Preferred first units are: ether-phenyl-ketone-phenyl-ether-phenyl-ketone-phenyl (i.e. n1=0, n2=1, n3=1, n4=0), ether-phenyl-ketone-phenyl-ketone-phenyl-ether-phenyl-ketone-phenyl-ketone-phenyl (i.e. n1=n2=n3=n4=1) and ether-phenyl-ketone-phenyl-ether-phenyl-ketone-phenyl-ketone-phenyl (ie n1=0, n2=n3=n4=1).

Said second ion-conducting unit may be of formula

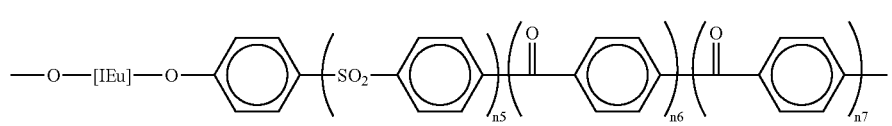

XVII wherein IEU refers to a unit which incorporates ion-exchange sites (e.g. it is sulphonated) and $n^5$, $n^6$ and $n^7$ represent 0 or 1 provided that the sum of $n^5$, $n^6$ and $n^7$ is at least 1. Preferably, IEU is a phenyl, biphenyl or di-substituted naphthalene group provided with ion-exchange sites. Preferred second units are: -ether-IEU-ether-phenyl-sulphone-phenyl-(i.e. $n^5$ is 1, $n^6=n^7=0$), -ether-IEU-ether-phenyl-ketone-phenyl-(i.e. $n^5=0$, $n^6=1$, $n^7=0$) and -ether-IEU-ether-phenyl-ketone-phenyl-ketone (i.e. $n^5=0$, $n^6=n^7=1$) wherein IEU represents any of the moieties described above.

Preferred optional third units are of general formula

—O-Ph-(SO$_2$-Ph)$_{n8}$-(CO-Ph)$_{n9}$-[AMOR]-    XVIII wherein $n^8$ is 0 or 1, $n^9$ is 0, 1 or 2 and AMOR represents an amorphous unit, for example of formulae:

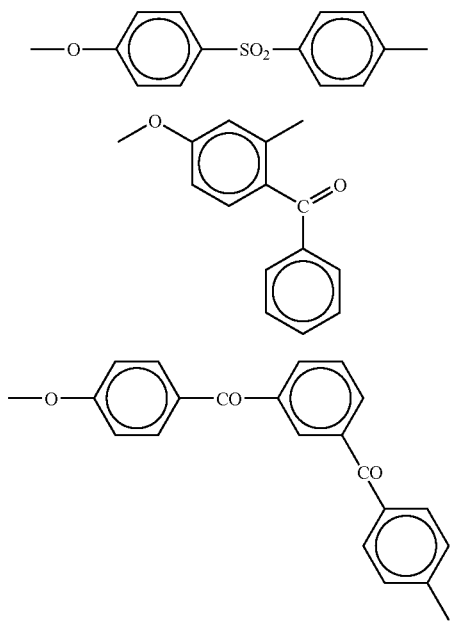

IXX

XX

XXI

The phenyl groups of the third unit of formula XVIII may be 1,3- or 1,4-substituted by the groups shown. Preferably, they are 1,4-substituted.

Preferred third units are: ether-phenyl-sulphone-phenyl-AMOR-(i.e. $n^8=1$, $n^9=0$ in formula XVIII), -ether-phenyl-ketone-phenyl-ketone-AMOR-(i.e. $n^8=0$, $n^9=2$), -ether-phenyl-ketone-phenyl-AMOR-(i.e. $n^8=0$, $n^9=1$) wherein AMOR represents moieties IXX, XX or XXI, especially IXX or XX.

Copolymers may be prepared having one or more first repeat units and one or more of said second repeat units.

Where said first polymeric material is a copolymer as described, the mole % of co-monomer units, for example said first and second repeat units described above, may be varied to vary the solubility of the material in solvent formulations that may be used in the preparation of said formed polymeric material and/or in other solvents, especially water. Also, the mole % of co-monomer units may be varied to vary the level of crystallinity and/or crystallisability. For homopolymers, the level of crystallinity and/or crystallisability may be determined by the level of functionalisation with ion-exchange sites.

Where a phenyl moiety is sulphonated, it may only be mono-sulphonated and this is preferred. However, in some situations it may be possible to effect bi- or multi-sulphonation.

Suitably "A*" represent the mole % of said first crystalline or crystallisable units in said first ion-conducting polymeric material; "B*" represents the mole % of said second ion-exchange units; and "C*" represents the mole % of said third amorphous units.

A* is preferably at least 5 and may be at least 10. It is preferably less than 70, more preferably less than 60, especially less than 40. B* is suitably at least 10, preferably at least 20, more preferably at least 30. It is preferably less than 70, more preferably less than 60, especially less than 50. C* is suitably at least 50, preferably at least 10, more preferably at least 20, especially at least 30. It may be less than 80, preferably less than 70.

The glass transition temperature ($T_g$) of said first ion-conducting polymeric material may be at least 144° C., suitably at least 150° C., preferably at least 154° C., more preferably at least 160° C., especially at least 164° C. In some cases, the Tg may be at least 170° C., or at least 190° C. or greater than 250° C. or even 300° C.

Said first polymeric material may have an inherent viscosity (IV) of at least 0.1, suitably at least 0.3, preferably at least 0.4, more preferably at least 0.6, especially at least 0.7 (which corresponds to a reduced viscosity (RV) of least 0.8) wherein RV is measured at 25° C. on a solution of the polymer in concentrated sulphuric acid of density 1.84 gcm$^{-3}$, said solution containing 1 g of polymer per 100 cm$^{-3}$ of solution. IV is measured at 25° C. on a solution of polymer in concentrated sulphuric acid of density 1.84 gcm$^3$, said solution containing 0.1 g of polymer per 100 cm$^3$ of solution. The measurements of both RV and IV both suitably employ a viscometer having a solvent flow time of approximately 2 minutes.

The equivalent weight (EW) of said ion-conductive polymeric material is preferably less than 850 g/mol, more preferably less than 800 g/mol, especially less than 750 g/mol. The EW may be greater than 300, 400 or 500 g/mol.

The boiling water uptake of ion-conductive polymeric material measured as described hereinafter is suitably less than 350%, preferably less than 300%, more preferably less than 250%.

The main peak of the melting endotherm (Tm) for said first polymeric material may be at least 300° C.

When said first polymeric material has at least some crystallinity or is crystallisable, said solvent formulation selected in step (ii) of the method suitably comprises a said second solvent part which is adapted to increase the crystallinity of said first polymeric material and suitably is able to do this independently of the presence of said first solvent part. For example, said first polymeric material in solid form may be immersed in said second solvent part whereupon after a period, its crystallinity may be increased. Water in said solvent formulation suitably is adapted to improve the ability of the solvent formulation to dissolve said first polymeric material compared to a case wherein said solvent formulation comprises said second solvent part alone. Water is not, however, adapted to increase the crystallinity of said first polymeric material in the manner described for said second solvent part.

Said solvent formulation may include further solvent parts. For example, it may include a third (and possibly other) solvent part(s) which may have any feature of said second solvent part. Preferably, however, said solvent formulation only includes a single solvent adapted to increase the crystallinity as described.

Said composite formulation may include a fourth solvent part. A said fourth solvent part may be part of the composite formulation in which the first ion-conducting polymeric material is dissolved or may be added to the composite formulation after said first ion-conducting polymeric material has been dissolved therein. Said fourth solvent part is suitably selected to optimise the formation and/or properties of said formed polymeric material. For example, when said formed polymeric material is a film, it may optimise formation of a unitary, smooth film. Said fourth solvent may have a plasticizing effect. Examples of suitable fourth parts are NMP and dimethylacetamide (DMAC).

The identity of said solvent formulation, the identity and/or relative amounts of said first and second solvent parts, the temperature and/or pressure at which said first polymeric material is dissolved in said solvent formulation and/or the amount of said first polymeric material to be dissolved may be selected according to the identity of said first polymeric material and/or (for crystalline or crystallisable materials) the level of its inherent crystallinity before dissolution and/or the extent to which it is desired to increase its level of crystallinity.

If, for example, a first polymeric material selected has relatively low inherent solubility in said second solvent part, then more of said first solvent part may be included in said solvent formulation to provide a satisfactory concentration of said first polymeric material dissolved in said solvent formulation. If, for example, said first polymeric material is an amorphous (optionally crystallisable) polymer then the solubility in said second solvent part may be higher (compared to a similar polymeric material having a higher level of crystallinity) and, accordingly, it may be possible to include a greater amount of said second solvent part in said formulation and the presence of such a greater amount may facilitate obtaining a relatively large difference in the crystallinity of said formed polymeric material compared to that of said first polymeric material when said first polymeric material is crystalline/crystallisable. Also, in general terms, the ratio of the amounts of first and second solvent parts may be varied to allow first polymeric materials of a range of crystallinities to be dissolved in said solvent formulation.

The ratio of the volume of said first solvent part to the volume of said second solvent part in said solvent formation is suitably in the range 0.2 to 5, preferably in the range 0.4 to 2.0, especially in the range 0.5 to 1.5.

The % v/v of said first solvent part in said solvent formulation is preferably at least 10% v/v, more preferably at least 20% v/v. In some embodiments, the % v/v may be at least 30% v/v. Suitably, the % v/v is less than 90% v/v, preferably less than 80% v/v, more preferably less than 70% v/v, especially less than 65% v/v. In some cases, the % v/v may be less than 60% v/v.

The % v/v of said second solvent part is suitably at least 10% v/v, preferably at least 25% v/v, more preferably at least 35% v/v, especially at least 40% v/v.

Said solvent formulation may include 0 to 30% v/v, preferably 0 to 25% v/v of a said third solvent part.

When said composite formulation includes a fourth solvent part, the % v/v of said fourth solvent part in said composite formulation may be in the range 0 to 10% v/v, preferably 0 to 7.5% v/v, especially 0 to 5% v/v.

Preferably, said composite formulation includes 10% v/v or less, more preferably 7.5% or less, especially 5% or less of NMP.

In the method, said composite formulation may include other dissolved or dispersed components. For example, said first polymeric material, together with one or more other polymeric materials may be dissolved in said solvent formulation to prepare said composite formulation. Said one or more other polymeric materials may be selected from ion-conducting polymeric materials which may be amorphous or crystalline/crystallisable and may have any feature of said first ion-conducting polymeric material described or may be non-conducting polymeric materials and/or amorphous polymeric materials. Suitably at least 50wt %, preferably at least 70wt %, more preferably at least 85wt %, especially at least 95wt % of the total of polymeric materials dissolved in said solvent formulation to prepare said composite formulation is comprised of said first ion-conducting polymeric material. Preferably, the only ion-conducting polymeric material (preferably the only polymeric material) dissolved in said solvent formulation is said first polymeric material.

Said desired form of said formed polymeric material is preferably a predetermined form suitably having a predetermined shape. Said desired form preferably comprises a part of an ion-conducting component for example an ion-conducting membrane or electrode, for example gas diffusion electrode, of a fuel cell. Said first polymeric material is preferably formed into said desired form in a process which includes the step of casting said first polymeric material in said solvent formulation.

A membrane which comprises, preferably consists essentially of, said formed polymeric material may be formed in the method. In this case, therefore, said membrane comprises a unitary material which may define, for example, a PEM of a fuel cell or electrolyser. In a subsequent step, a catalyst material may be contacted with said membrane on both sides thereof. Alternatively, said formed polymeric material may be a part of a composite membrane, for example a composite ion-conducting membrane.

In the method, said formed polymeric material may be associated with a composite membrane material to form a composite membrane in a variety of ways. For example, said formed polymeric material in the form of an unsupported conductive polymer film can be contacted with, for example laminated to, a said composite membrane material. Alternatively (and preferably), one of either said composite membrane material or said formed polymeric material may be impregnated with the other one of either said composite membrane material or said formed polymeric material.

Said composite membrane material may be a support material for supporting said formed polymeric material. In this case, said composite membrane material preferably is stronger and/or has a lower water absorbance compared to said formed polymeric material.

Alternatively, said formed polymeric material may be a support for the composite membrane material.

Examples of composite membrane materials include:
(A) materials comprising or, preferably consisting essentially of, polytetrafluoroethylene, suitably provided as a porous film. Such a support material may be as described in accordance with WO97/25369 and WO96/28242 and the contents of the aforementioned documents as regards the polytetrafluoroethylene are incorporated herein by reference; and surface modified polytetrafluoro-ethylene.
(B) optionally-substituted polyolefins, especially optionally-substituted polypropylene or polyethylene and copolymers of any of the aforesaid.
(C) Lyotropic liquid crystalline polymers, such as a polybenzazole (PBZ) or polyaramid (PAR or Kevlar®) polymer. Preferred polybenzazole polymers include polybenzoxazole (PBO), polybenzothiazole (PBT) and polybenzimidazole (PBI) polymers. Preferred polyaramid polymers include polypara-phenylene terephthalamide (PPTA) polymers. Structures of the above-mentioned polymers are listed in Table 4 of WO99/10165, the contents of which are incorporated herein by reference.
(D) Polysulfone (PSU), polyimide (PI), polyphenylene oxide (PPO), polyphenylene sulphoxide (PPSO), polyphenylene sulphide (PPS), polyphenylene sulphide sulphone ($PPS/SO_2$), polyparaphenylene (PPP), polyphenylquinoxaline (PPQ), polyarylketone, polyethersulphone (PES) and polyetherketone and polyetheretherketone polymers, for example PEK™ polymers and PEEK™ polymers respectively from Victrex Plc.
(E) Polymers having moieties I, II and/or III and/or preferred repeat units IV, IV*, V and V*, as described above for said first polymeric material, except that such polymers may be crystallisable, crystalline or amorphous and may not be functionalised to provide ion-exchange sites.
(F) Polymers described in (E), wherein at least some units I, II and/or III are functionalized to provide ion-exchange sites suitably of a type described herein with reference to said first polymeric material.
(G) Polymers described in (D) which are functionalized, especially sulphonated, to provide ion-exchange sites, as described in WO99/10165.
(H) Perfluorinated ionomers, for example carboxyl-, phosphonyl- or sulphonyl-substituted perfluorinated vinyl ethers as described in WO99/10165. An especially preferred example is NAFION (Trade Mark)—a perfluorosulphonate ionomer described in Journal of Electrochemical Society, Vol 132, pp 514–515 (1985).
(I) Ion-conductive polymers comprising $\alpha,\beta,\beta$-trifluorostyrene monomeric units as described in WO97/25369, the content of which is incorporated herein by reference.
(J) Ion-conducting polymers comprising polystyrene sulphonic acid (PSSA), polytrifluorostyrene sulphonic acid, polyvinyl phosphonic acid (PVPA), polyvinyl carboxylic (PVCA) acid and polyvinyl sulphonic acid (PVSA) polymers, and metals salts thereof.

When the composite membrane material is not an ion-conducting material it preferably acts as a support for said formed polymeric material.

When the composite membrane material is impregnated with said formed polymeric material said composite membrane material may be a fabric or a microporous membrane. When said composite membrane material is a fabric, the method may include a step of contacting the fabric with said composite formulation in order to impregnate said fabric. Thereafter, the method includes providing conditions for removal of said solvent formulation, leaving said formed polymeric material in pores of said fabric.

If said composite membrane material is a crystalline or crystallisable polymeric material for example having moieties I, II and/or III and/or preferred repeat units IV, IV*, V and V*, then on contact with said composite formulation, the composite membrane material may plasticise and, in some circumstances, the crystallinity of the material may be increased.

When said composite membrane material is a microporous membrane, the method may include the step of contacting the microporous membrane with said composite formulation in order to impregnate said micoporous membrane. Thereafter, the method includes providing conditions for removal of said solvent formulation leaving said formed polymeric material in pores in said microporous membrane.

When said composite membrane material is a microporous membrane, preparation of the membrane may include a step of contacting a composite membrane material with a solvent formulation comprising a solubilizing solvent which solubilizes, to some degree, the composite membrane material. Subsequently, the method preferably includes the step of contacting the composite membrane material with a second, suitably aqueous, phase inversion solvent which is arranged to cause phase inversion, thereby resulting in said composite membrane material being rendered porous.

One example of a composite membrane may comprise a microporous membrane of polyetherketone which may be prepared by casting a solution of polyetherketone in sulphuric acid followed by phase inversion using an aqueous solvent, especially water. Then, said microporous membrane may be impregnated with a composite formulation for example comprising a first ion-conducting polymeric material in a said solvent formulation for example comprising an acetone/water mixture. Advantageously, said solvent formulation may increase the crystallinity of the polyetherketone.

After impregnation of a microporous membrane as described above, the arrangement may be post-treated, suitably so as to produce a substantially continuous film of said first ion-conducting polymeric material on the composite membrane material.

When the composite membrane material is an ion-conducting material either said composite membrane material or said formed polymeric material may act as a support for the other one of either the formed polymeric material or membrane material.

When the composite membrane material or said first ion-conducting polymeric material acts as a support for the other, then the material which is to provide the support may be rendered microporous as described above and the other material impregnated therein.

Any suitable conditions for removal of said solvent formulation in step (v) of said method may be provided. Conveniently, said formulation is removed by evaporation in an environment arranged at a temperature greater than ambient temperature, for example at a temperature of at least 50° C. and, preferably, less than 150° C.

A said formed polymeric material as described herein may be used in fuel cells (e.g. Hydrogen Fuel Cells or Direct Methanol Fuel Cells) or electrolysers. Said formed polymeric material may also be used in filtration (as parts of filtration membranes), for example in ultrafiltration, microfiltration or in reverse osmosis.

The following further utilities for said formed polymeric material are also contemplated:

1. Proton exchange membrane based water electrolysis, which involves a reverse chemical reaction to that employed in hydrogen/oxygen electrochemical fuel cells.
2. Chloralkali electrolysis, typically involving the electrolysis of a brine solution to produce chlorine and sodium hydroxide, with hydrogen as a by-product.
3. Electrode separators in conventional batteries due to the chemical inertness and high electrical conductivity of the composite membranes.
4. Ion-selective electrodes, particularly those used for the potentiometric determination of a specific ion such as $Ca^{2+}$, $Na^+$, $K^+$ and like ions. The formed polymeric material could also be employed in a sensor material for humidity sensors, as the electrical conductivity of an ion exchange membrane varies with humidity.
5. Ion-exchange material for separations by ion-exchange chromatography. Typical such applications are deionization and desalination of water (for example, the purification of heavy metal contaminated water), ion separations (for example, rare-earth metal ions, trans-uranium elements), and the removal of interfering ionic species.
6. Ion-exchange membranes employed in analytical preconcentration techniques (Donnan Dialysis). This technique is typically employed in analytical chemical processes to concentrate dilute ionic species to be analysed.
7. Ion-exchange membranes in electrodialysis, in which membranes are employed to separate components of an ionic solution under the driving force of an electrical current. Electrolysis applications include the industrial-scale desalination of brackish water, preparation of boiler feed make-up and chemical process water, de-ashing of sugar solutions, deacidification of citrus juices, separation of amino acids, and the like.
8. Membranes in dialysis applications, in which solutes diffuse from one side of the membrane (the feed side) to the other side according to their concentration gradient. Separation between solutes is obtained as a result of differences in diffusion rates across the membrane arising from differences in molecular size. Such applications include hemodialysis (artificial kidneys) and the removal of alcohol from beer.
9. Membranes in gas separation (gas permeation) and pervaporation (liquid permeation) techniques.
10. Bipolar membranes employed in water splitting and subsequently in the recovery of acids and bases from waste water solutions.

The most preferred use of said formed polymeric material is as a part of or substantially the whole of a polymer electrolyte membrane in a fuel cell.

According to a second aspect of the invention, there is provided a method of preparing a membrane electrode assembly, the method including associating a catalyst material with a polymeric material prepared in a method according to the first aspect. Said polymeric material may be a component of a composite membrane as described according to said first aspect.

According to a third aspect of the invention, there is provided a membrane electrode assembly prepared as described according to the second aspect.

According to a fourth aspect of the invention, there is provide a method of making a fuel cell, the method including associating a polymeric material and/or a membrane electrode assembly as described according to the first, second or third aspects with other components of said fuel cell.

According to a fifth aspect of the present invention, there is provided a fuel cell (e.g. a Hydrogen Fuel Cell or Direct Methanol Fuel Cell) incorporating a polymeric material and/or membrane electrode assembly as described according to the first, second, third and fourth aspects of the present invention.

Polymers having units I, II, III, IV, IV*, V and/or V* described herein may be prepared by:

(a) polycondensing a compound of general formula

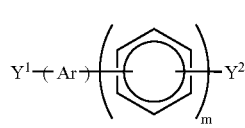

VI with itself wherein $Y^1$ represents a halogen atom or a group -EH and $Y^2$ represents a halogen atom or, if $Y^1$ represents a halogen atom, $Y^2$ represents a group E'H; or (b) polycondensing a compound of general formula

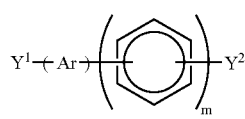

VI with a compound of formula

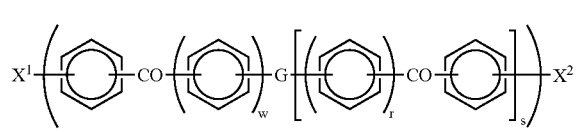

VII and/or with a compound of formula

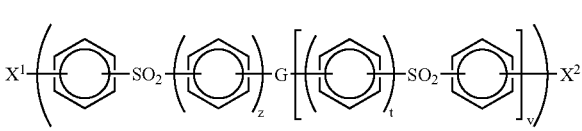

VIII wherein $Y^1$ represents a halogen atom or a group -EH (or -E'H if appropriate) and $X^1$ represents the other one of a halogen atom or group -EH (or -E'H if appropriate) and $Y^2$ represents a halogen atom or a group -E'H and $X^2$ represents the other one of a halogen atom or a group -E'H (or -EH if appropriate).

(c) optionally copolymerizing a product of a process as described in paragraph (a) with a product of a process as described in paragraph (b);

wherein the phenyl moieties of units VI, VII and/or VIII are optionally substituted; the compounds VI, VII and/or VIII are optionally sulphonated; and Ar, m, w, r, s, z, t, v, G, E and E' are as described above except that E and E' do not represent a direct link;

the process also optionally comprising sulphonating and/or cross-linking a product of the reaction described in paragraphs (a), (b) and/or (c) to prepare said polymer.

In some situations, the polymer prepared, more particularly phenyl groups thereof, may be optionally substituted with the groups hereinabove described after polymer formation.

Preferably, where $Y^1$, $Y^2$, $X^1$ and/or $X^2$ represent a halogen, especially a fluorine, atom, an activating group, especially a carbonyl or sulphone group, is arranged ortho- or para- to the halogen atom.

Preferred halogen atoms are fluorine and chlorine atoms, with fluorine atoms being especially preferred. Preferably, halogen atoms are arranged meta- or para- to activating groups, especially carbonyl groups.

Where the process described in paragraph (a) is carried out, preferably one of $Y^1$ and $Y^2$ represents a fluorine atom and the other represents an hydroxy group. More preferably in this case, $Y^1$ represents a fluorine atom and $Y^2$ represents an hydroxy group. Advantageously, the process described in paragraph (a) may be used when Ar represents a moiety of structure (i) and m represents 1.

When a process described in paragraph (b) is carried out, preferably, $Y^1$ and $Y^2$ each represent an hydroxy group. Preferably, $X^1$ and $X^2$ each represent a halogen atom, suitably the same halogen atom.

The polycondensation reaction described is suitably carried out in the presence of a base, especially an alkali metal carbonate or bicarbonate or a mixture of such bases. Preferred bases for use in the reaction include sodium carbonate and potassium carbonate and mixtures of these.

The identity and/or properties of the polymers prepared in a polycondensation reaction described may be varied according to the reaction profile, the identity of the base used, the temperature of the polymerisation, the solvent(s) used and the time of the polymerisation. Also, the molecular weight of a polymer prepared may be controlled by using an excess of halogen or hydroxy reactants, the excess being, for example, in the range 0.1 to 5.0 mole %

In a polymer prepared in a said polycondensation reaction involving compounds of general formula VI, VII, and VIII, moieties of general formula VI, VII, and VIII (excluding end groups $Y^1$, $Y^2$, $X^1$ and $X^2$) may be present in regular succession (that is, with single units of one said moiety, separated by single units of another said moiety or moieties), or semi-regular succession (that is, with single units of one said moiety separated by strings of another moiety or moieties which are not all of the same length) or in irregular succession (that is, with at least some multiple units of one moiety separated by strings of other moieties that may or may not be of equal lengths). The moieties described are suitably linked through ether or thioether groups.

Also, moieties in compounds VI, VII and VIII arranged between a pair of spaced apart —O— atoms and which include a -phenyl-$SO_2$ or -phenyl-CO— bonded to one of the —O— atoms may, in the polymer formed in the polycondensation reaction, be present in regular succession, semi-regular succession or in irregular succession, as described previously.

In any sampled polymer, the chains that make up the polymer may be equal or may differ in regularity from one another, either as a result of synthesis conditions or of deliberate blending of separately made batches of polymer.

Compounds of general formula VI, VII and VIII are commercially available (eg from Aldrich U.K.) and/or may be prepared by standard techniques, generally involving Friedel-Crafts reactions, followed by appropriate derivatisation of functional groups. The preparations of some of the monomers described herein are described in P M Hergenrother, B J Jensen and S J Havens, Polymer 29, 358 (1988), H R Kricheldorf and U Delius, Macromolecules 22, 517 (1989) and P A Staniland, Bull, Soc, Chem, Belg., 98 (9–10), 667 (1989).

Where compounds VI, VII and/or VIII are sulphonated, compounds of formulas VI, VII and/or VIII which are not sulphonated may be prepared and such compounds may be sulphonated prior to said polycondensation reaction.

Sulphonation as described herein may be carried out in concentrated sulphuric acid (suitably at least 96% w/w, preferably at least 97% w/w, more preferably at least 98% w/w; and preferably less than 98.5% w/w) at an elevated temperature. For example, dried polymer may be contacted with sulphuric acid and heated with stirring at a temperature of greater than 40° C., preferably greater than 55° C., for at least one hour, preferably at least two hours, more preferably about three hours. The desired product may be caused to precipitate, suitably by contact with cooled water, and isolated by standard techniques. Sulphonation may also be effected as described in U.S. Pat. No. 5,362,836 and/or EP0041780.

When said first polymeric material comprises a first crystalline or crystallisable unit, a second ion-exchange unit and a third amorphous unit as described above, the process may comprise:

polycondensing a compound of formula $X^1$-BM-$X^2$  IXXX with a compound of formula $Y^1$—SU—$Y^2$ 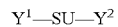 XXX and with a compound of formula $Y^1$—XT-$Y^2$ 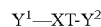 XXXI and with a compound of formula $Z^1$-AM-$Z^2$  XXXII thereby to prepare a copolymer, wherein $Y^1$ represents a halogen atom or a group -EH (or -E'H if appropriate) and $X^1$ represents the other one of a halogen atom or group -EH (or -E'H if appropriate), $Y^2$ represents a halogen atom or a group —E'H and $X^2$ represents the other one of a halogen atom or a group -E'H (or -EH if appropriate) and $Z^1$ and $Z^2$ represent a halogen atom or a group -EH (or E'H if appropriate);

and wherein BM represents part of a base monomer, SU represents part of a moiety which is functionalised or can be functionalised (suitably independently of other moieties in the copolymer) to provide ion-exchange sites, XT represents a part of a crystalline or crystallisable moiety and AM represents part of an amorphous moiety.

The polycondensation reaction may be carried out as described above.

First crystalline/crystallisable units of formula XVI described above are preferably prepared by reaction of a dihydroxy-containing monomer with a di-halogen-containing monomer provided that the monomers include only single phenyl moieties (i.e. no multi-phenylene moieties) separated by —CO— or —O— groups between the halogen or hydroxy end groups thereof. Second ion-conducting units of formula XVII described above are preferably prepared by reaction of dihydroxybiphenyl, dihydroxybenzene or dihydroxynaphthalene with a halogen-containing monomer followed by post-sulphonation of the units. Optional third units of formula XVIII may be prepared by reaction of 4,4'- dihydroxydiphenylsulphone or 2,4-dihydroxybenzophenone with a halogen-containing monomer.

Preferred combinations of monomers for preparation of polymers which, after sulphonation, are crystalline/crystallisable are detailed in Tables 1 and 2 is below wherein the * in each row indicates the monomers that can be used to prepare preferred polymers. In the tables, the following abbreviations are used:

BP 4,4'dihydroxybiphenyl
HQ hydroquinone
DHN dihydroxynaphthalene (Examples include 1,5-; 1,6-; 2,3-; and 2,7-)
BDF 4,4'-difluorobenzophenone.
DCDPS 4,4'-dichlorodiphenylsulphone.
DKDH 1,4-bis-(4-hydroxybenzoyl)benzene.
DKDF 1,4-bis-(4-fluorobenzoyl)benzene.
DHB 4,4'-dihydroxybenzophenone.
2,4-DHB 2,4-dihydroxybenzophenone.
Bis-S 4,4'-dihydroxydiphenylsulphone.

TABLE 1

| BP | HQ | DHN | BDF | DKDF | DHB | 2,4-DHB | Bis-S |
|----|----|-----|-----|------|-----|---------|-------|
| * |    | *   | *   |      |     |         |       |
| * |    | *   | *   |      |     |         | *     |
| * |    | *   | *   | *    |     |         |       |
| * |    | *   | *   |      |     | *       |       |
| * |    |     |     | *    | *   |         |       |
| * |    |     |     | *    | *   |         | *     |
| * |    |     |     | *    | *   | *       |       |
| * |    |     |     | *    |     | *       |       |
| * |    |     |     |      | *   | *       |       |
|   | *  |     | *   |      | *   |         |       |
|   | *  |     | *   |      | *   |         | *     |
|   | *  |     | *   |      | *   | *       |       |
|   | *  |     | *   |      |     |         | *     |
|   | *  |     |     | *    | *   |         |       |
|   | *  |     |     | *    | *   | *       |       |
|   | *  |     |     | *    |     |         | *     |
|   | *  |     |     |      | *   | *       |       |
|   |    | *   | *   |      | *   |         |       |
|   |    | *   | *   |      | *   | *       |       |
|   |    | *   | *   |      |     |         | *     |
|   |    | *   |     | *    | *   |         |       |
|   |    | *   |     | *    | *   |         | *     |
|   |    | *   |     |      | *   | *       |       |

TABLE 2

| BP | HQ | DHN | BDF | DKDF | DKDH | 2,4-DHB | Bis-S |
|----|----|-----|-----|------|------|---------|-------|
| * |    | *   | *   |      |      |         |       |
| * |    | *   | *   |      |      |         | *     |
| * |    | *   | *   | *    |      |         |       |
| * |    | *   | *   |      |      | *       |       |
| * |    |     |     | *    | *    |         |       |
| * |    |     |     | *    | *    |         | *     |
| * |    |     |     | *    | *    | *       |       |
| * |    |     |     | *    |      | *       |       |
| * |    |     |     |      | *    | *       |       |

TABLE 2-continued

| BP | HQ | DHN | BDF | DKDF | DKDH | 2,4-DHB | Bis-S |
|----|----|-----|-----|------|------|---------|-------|
| * |    |     |     | *    | *    |         | *     |
| * |    |     |     | *    | *    | *       |       |
| * |    |     |     | *    |      |         | *     |
| * |    |     |     | *    |      | *       |       |
|   | *  |     | *   |      | *    |         |       |
|   | *  |     | *   |      | *    |         | *     |
|   | *  |     | *   |      | *    | *       |       |
|   | *  |     | *   |      |      |         | *     |
|   | *  |     |     | *    | *    |         |       |
|   | *  |     |     | *    |      | *       |       |
|   |    | *   | *   |      | *    |         | *     |
|   |    | *   |     | *    | *    |         |       |
|   |    | *   |     | *    | *    |         | *     |
|   |    | *   |     | *    |      |         | *     |
|   |    | *   |     | *    | *    |         |       |

More complex combinations comprising the combinations in Table 1 together with one or more additional monomer may be selected, from example, BP+BDF+Bis-S+DCDPS+DHB.

The invention extends to any novel polymer, whether provided with ion-exchange sites or otherwise, described herein. The invention extends to any novel polymer, pre- or post-sulphonated prepared from the monomers described in Tables 1 and 2.

Details on the preparation of polymers and processes for the preparation of membranes therefrom are provided in WO00/15691, PCT/GB00/03449, GB0031209.0, GB0031208.2 and GB0031207.4 and the contents of the aforesaid are incorporated herein by reference.

Unless otherwise stated, all chemicals referred to hereinafter were used as received from Sigma-Aldrich Chemical Company, Dorset, U.K.

Specific embodiments of the invention will now be described, by way of example.

EXAMPLE 1a

A 700 ml flanged flask fitted with a ground glass Quickfit lid, stirrer/stirrer guide, nitrogen inlet and outlet was charged with 4,4'-difluorobenzophenone (89.03 g, 0.408 mole), 4,4'-dihydroxybiphenyl (24.83 g, 0.133 mole) 4,4'-dihydroxydiphenylsulphone (66.73 g, 0.267 mole), and diphenysulphone (332 g) and purged with nitrogen for over 1 hour. The contents were then heated under a nitrogen blanket to between 140 and 150° C. to form an almost colourless solution. While maintaining a nitrogen blanket, dried sodium carbonate (42.44 g, 0.4 mole) and potassium carbonate (1.11 g, 0.008 mole) were added. The temperature was raised gradually to 315° C. over 3 hours then maintained for 0.5 hours.

The reaction mixture was allowed to cool, milled and washed with acetone and water. The resulting polymer was dried in an air oven at 120° C. The polymer had a melt viscosity at 400° C., 1000 $sec^{-1}$ of 0.62 $kNsm^{-2}$.

EXAMPLE 1b

A 700 ml flanged flask fitted with a ground glass Quickfit lid, stirrer/stirrer guide, nitrogen inlet and outlet was charged with 4,4'-difluorobenzophenone (89.03 g, 0.408 mole), 4,4'-dihydroxybiphenyl (24.83 g, 0.133 mole), 4,4'-dihydroxydiphenylsulphone (53.65 g, 0.213 mole), 4,4'-dihydroxybenzophenone (11.37 g, 0.053 mole) and diphenysulphone (332 g) and purged with nitrogen for over 1 hour. The contents were then heated under a nitrogen blanket to between 140 and 150° C. to form an almost colourless solution. While maintaining a nitrogen blanket, dried sodium carbonate (43.24 g, 0.408 mole) was added. The temperature was raised gradually to 320° C. over 3 hours then maintained for 1.5 hours.

The reaction mixture was allowed to cool, milled and washed with acetone and water. The resulting polymer was dried in an air oven at 120° C. The polymer had a melt viscosity at 400° C., 1000 sec$^{-1}$ of 0.53 kNsm$^{-2}$.

EXAMPLE 1c

The polymerisation procedure of Example 1b was followed, for 1c, except that the copolymer was prepared by varying the mole ratios of the hydroxy-containing reactants.

A summary of the mole ratios and MV are detailed in Table A below.

EXAMPLES 1d and 1e

The polymerisation procedure of Example 1a and 1b were followed, for 1d and 1e respectively, except that copolymers were prepared by varying the mole ratios of the hydroxy-containing reactants.

A summary of the mole ratios and MVs for the aforementioned examples are detailed in the Table A below. BDF, BP, DHB and Bis-S have the meanings described above.

TABLE A

| | Polymer composition (mole ratio) | | | | MV |
|---|---|---|---|---|---|
| Example | BDF | BP | DHB | Bis-S | (kNsm$^{-2}$) |
| 1a | 1.02 | 0.33 | — | 0.67 | 0.62 |
| 1b | 1.02 | 0.33 | 0.133 | 0.536 | 0.53 |
| 1c | 1.02 | 0.33 | 0.268 | 0.402 | 0.38 |
| 1d | 1.02 | 0.40 | — | 0.6 | 0.26 |
| 1e | 1.02 | 0.40 | 0.24 | 0.36 | 0.60 |

EXAMPLE 2

General Sulphonation Procedure

The polymers of Examples 1a–1e were sulphonated by stirring each polymer in 98% sulphuric acid (3.84 g polymer/100 g sulphuric acid) for 21 hours at 50° C. Thereafter, the reaction solution was allowed to drip into stirred deionised water. Sulphonated polymer precipitated as free-flowing beads. Recovery was by filtration, followed by washing with deionised water until the pH was neutral and subsequent drying. In general, titration confirmed that 100 mole % of the biphenyl units had sulphonated, giving one sulphonic acid group, ortho to the ether linkage, on each of the two aromatic rings comprising the biphenyl unit.

EXAMPLE 3a

Membrane Fabrication

Membranes were produced from the polymers from Examples 1a to 1e after sulphonation as described in Example 2 by dissolving the polymers in the solvent systems at the concentrations and at the temperature as described in Table B below. The concentrations used were approximately equal to the maximum concentration to which a particular polymer could be dissolved in a specified solvent system. Table B details results using NMP alone for the purposes of comparison with other solvent systems described. In the case of the solvent systems which include a "*", the particular polymer was dissolved in the solvent system shown and, thereafter, 5% v/v NMP was added to the solution prior to casting.

The homogeneous solutions were cast onto clean glass plates and then drawn down to give 400 micron films, using a Gardner Knife. The solvent was then evaporated at the temperature as described in Table B.

EXAMPLE 3b

Boiling Water Uptake

The following general procedure was followed to determine the Boiling Water Uptake of the membranes prepared.

5 cm×5 cm samples of membranes were selected. The thickness of the samples was related to the concentration of polymers in the solvent systems used to cast the membranes. The membranes were separately immersed in boiling deionised water (500 ml) for 60 mins, removed and dried quickly with lint-free paper to remove surface water, weighed, dried in an oven at 50° C. for 1 day, allowed to cool to ambient temperature in a desiccator then weighed quickly. The % water-uptake was calculated as described below:

$$\% \text{ Water-uptake} = \frac{\text{Wet Weight} - \text{Dry Weight}}{\text{Dry Weight}} \times 100$$

Results for membranes assessed are provided in the Table B.

The following abbreviations are used in the Table:
NMP—N-methylpyrrolidone
DCM—dichloromethane
MeOH—methanol
DMAC—dimethylacetamide
THF—tetrahydrofuran
MEK—methyl ethyl ketone
EA—ethyl acetate
CHX—cyclohexanone

TABLE B

| Polymer from specified example after sulphonation as described in example 2 | Theoretical EW | Measured EW by titration | Solvent System | Solvent ratio (v/v) | Conc % w/w | Dissolution Temperature (° C.) | Evaporation Temperature (° C.) | Boiling Water Uptake (%) |
|---|---|---|---|---|---|---|---|---|
| 1a | 690 | 660 | NMP | 1 | 15 | RT | 100 | 165 |
| 1a | — | — | Water/Ace* | 0.5:0.5 | 15 | RT | 80 | 170 |

TABLE B-continued

| Polymer from specified example after sulphonation as described in example 2 | Theoretical EW | Measured EW by titration | Solvent System | Solvent ratio (v/v) | Conc % w/w | Dissolution Temperature (° C.) | Evaporation Temperature (° C.) | Boiling Water Uptake (%) |
|---|---|---|---|---|---|---|---|---|
| 1b | 683 | 663 | NMP | 1 | 15 | RT | 100 | 160 |
| 1b | — | — | Water/DCM/MeOH* | 0.4:0.5:0.1 | 10 | 40–50 | 70 | 60 |
| 1b | — | — | Water/THF* | 0.5:0.5 | 10 | 70–80 | 80 | 71 |
| 1b | — | — | Water/THF* | 0.7:0.3 | 16 | 70–80 | 80 | 140 |
| 1b | — | — | Water/MEK/MeOH* | 0.4:0.5:0.1 | 10 | 80–90 | 80 | 75 |
| 1b | — | — | Water/Ace/EA* | 0.4:0.4:0.2 | 7.5 | 60–70 | 80 | 74 |
| 1b | — | — | Water/Ace* | 0.35:0.65 | 10 | 60–70 | 80 | 88 |
| 1b | — | — | Water/Ace* | 0.50:0.50 | 10 | 60–70 | 80 | 102 |
| 1b | — | — | Water/Ace/NMP | 0.475:0.475:0.05 | 10 | 60–70 | 80 | 105 |
| 1b | — | — | Water/Ace/DMAc | 0.475:0.475:0.05 | 10 | 60–70 | 80 | 99 |
| 1b | — | — | water/Ace/MEK* | 0.4:0.1:0.5 | 7.5 | 50–60 | 80 | 88 |
| 1b | — | — | water/CHX/MeOH* | 0.4:0.5:0.1 | 7.5 | 60–70 | 80 | 86 |
| 1b | — | — | water/EA/MeOH* | 0.25:0.5:0.25 | 6 | RT | 80 | 89 |
| 1c | 676 | 685 | NMP | 1 | 15 | 80 | 100 | 100 |
| 1c | — | — | water/Acetone* | 0.5:0.5 | 10 | 60–70 | 80 | 77 |
| 1c | — | — | Water/Ace/NMP | 0.475:0.475:0.05 | 10 | 60–70 | 80 | 74 |
| 1c | — | — | Water/Ace/DMAc | 0.575:0.375:0.05 | 10 | 60–70 | 80 | 85 |
| 1c | — | — | water/Ace/MEK* | 0.65:0.25:0.1 | 12 | 70–80 | 80 | 79 |
| 1c | — | — | water/THF* | 80:20 | 15 | 70–70 | 80 | 79 |
| 1d | 583 | 602 | NMP | 1 | 15 | RT | 100 | 520 |
| 1d | — | — | Acetone/water* | 0.5:0.5 | 10 | RT | 80 | 560 |
| 1e | 564 | 564 | NMP | 1 | 15 | RT | 100 | 550 |
| 1e | — | — | Ace/water* | 0.5:0.5 | 10 | 60–70 | 80 | 154 |
| 1e | — | — | THF/water* | 0.5:0.5 | 10 | 70–80 | 80 | 143 |

EXAMPLE 4

Determination of the Crystallinity Index Values of Polymers by Wide Angle X-Ray Scattering (WAXS)

Crystallinity can be quantified, in one method, by defining a "crystallinity index" for measurements made by Wide Angle X-ray Scattering (WAXS). This approach defines the measurement in relation to the WAXS pattern. The measured area of crystalline peaks in the WAXS pattern is taken as a percentage of the total crystalline and amorphous scatter over a chosen angular range of the pattern. Crystallinity index should, to a first approximation, be proportional to crystallinity for broadly similar polymer materials. It is constrained to be zero when crystallinity is zero and 100% when crystallinity is 100%.

Membranes of the sulphonated polymers from Examples 1a, 1b and 1c after sulphonation as described in Example 2 were cast from NMP and acetone/water (0.5:0.5) as described in Example 3a and then examined by WAXS as described below.

The membranes were analysed using a Siemens D5000 X-ray diffractometer with Cu K-alpha radiation and a Kevex energy dispersive detector. Measurements were made from a single membrane sheet mounted in symmetrical reflection geometry. A programmable divergence slit was used to maintain a constant irradiated region of the specimen surface 6 mm long over a 2-theta measurement range of 10–49°.

The WAXS pattern of membranes made from the sulphonated polymer from Example 1a cast from NMP and acetone/water respectively and a membrane made from the sulphonated polymer from Example 1b cast from NMP exhibited only broad amorphous scatter, whereas the patterns for membranes from Example 1c material cast from NMP and Examples 1b and 1c material cast from acetone/water exhibited crystalline peaks in addition to amorphous bands.

The measured WAXS patterns were analysed by first making a background correction, subtracting the corresponding WAXS pattern from a blank specimen holder. The resulting patterns were fitted by a combination of a pattern measured from a similar but amorphous membrane film and a set of peaks (at approximately 18.8, 20.8, 22.9, 29.1 and 40.0° 2-theta) corresponding to those observed in the more crystalline membranes. The crystallinity index was calculated as the total area fitted by these peaks taken as a percentage of the combined area of the fitted peaks and the fitted amorphous pattern.

| Sulphonated polymer from Example | Crystallinity Index (%) |
|---|---|
| 1a cast from NMP | 0 |
| 1a cast from acetone/water (0.5:0.5) | 0 |
| 1b cast from NMP | 0 |
| 1b cast from acetone/water (0.5:0.5) | 0.5 |

-continued

| Sulphonated polymer from Example | Crystallinity Index (%) |
|---|---|
| 1c cast from NMP | 2 |
| 1c cast from acetone/water (0.5:0.5) | 7.6 |

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

Any feature of any aspect of any invention or embodiment described herein may be combined with any feature of any aspect of any other invention or embodiment described herein.

The invention claimed is:

1. A method of preparing an ion-conducting polymeric material in a desired form (hereinafter "said formed polymeric material"), the method comprising:
    (i) selecting a first ion-conducting polymeric material which is crystalline or crystallisable, wherein said first ion-conductive polymeric material is one having a moiety of formula:

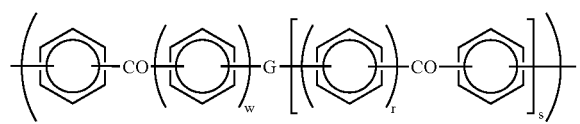

and/or a moiety of formula

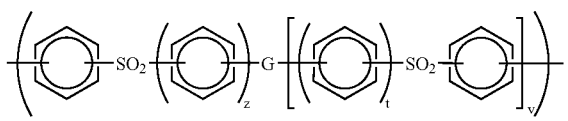

and/or a moiety of formula

III wherein at least some of the units I, II and/or III are functionalized to provide ion-exchange sites, wherein the phenyl moieties in units I, II, and III are independently optionally substituted and optionally cross-linked; and wherein m, r, s, t, v, w and z independently represent zero or a positive integer, E and E' independently represent an oxygen or a sulphur atom or a direct link, G represents an oxygen or sulphur atom, a direct link or a —O—Ph—O— moiety where Ph represents a phenyl group and Ar is selected from one of the following moieties (i)* or (i) to (x) which is bonded via one or more of its phenyl moieties to adjacent moieties;
    (ii) selecting a solvent formulation which can dissolve said first ion-conducting polymeric material and increase its crystallinity, wherein said formulation includes a first solvent part which is water;
    (iii) preparing a composite formulation in a process which includes dissolving first ion-conducting polymeric material in said solvent formulation;
    (iv) forming said composite formulation into a desired form;
    (v) providing conditions for removal of said solvent formulation from said form described in (iv) thereby to prepare said formed polymeric material.

2. A method according to claim 1, wherein said solvent formulation in which said first ion-conducting polymeric material is dissolved includes a second solvent part.

3. A method according to claim 2, wherein said second solvent part is an organic solvent.

4. A method according to claim 3, wherein said second solvent part has a boiling point at atmospheric pressure of greater than −30° C. and less than 200° C.

5. A method according to claim 2, wherein said second solvent part is able to form a dipole-dipole interaction with the first polymeric material.

6. A method according to claim 2, wherein said second solvent part includes a ketone, ether or haloalkyl group or an unsaturated ring structure.

7. A method according to claim 2, wherein said second solvent part is a polar aprotic solvent.

8. A method according to claim 2, wherein said second solvent part is selected from benzene, toluene, dichloromethane, tetrahydrofuran, cyclopentanone, acetone, 1,3-dichloropropane, chlorobenzene, tetrafluoroethane, diethylketone, methylethyl ketone, cyclohexanone and ethylbenzene.

9. A method according to claim 2, wherein said second solvent part is selected from acetone, tetrahydrofuran and dichloromethane.

10. A method according to claim 2, wherein said second solvent part is acetone.

11. A method according to claim 1, wherein said first polymeric material is sulphonated.

12. A method according to claim 1, wherein said first polymeric material is a homopolymer having a repeat unit of general formula

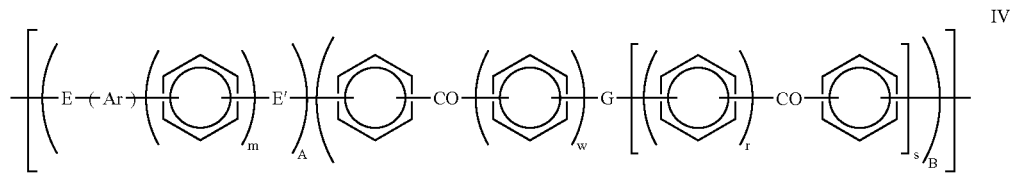

or a homopolymer having a repeat unit of general formula

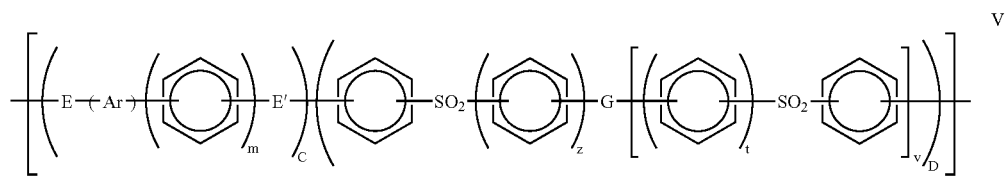

or a homopolymer having a repeat unit of general formula

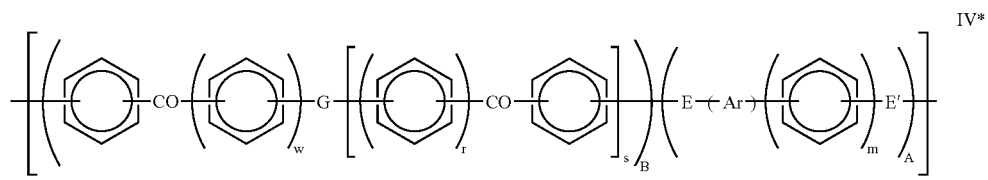

or a homopolymer having a repeat unit of general formula

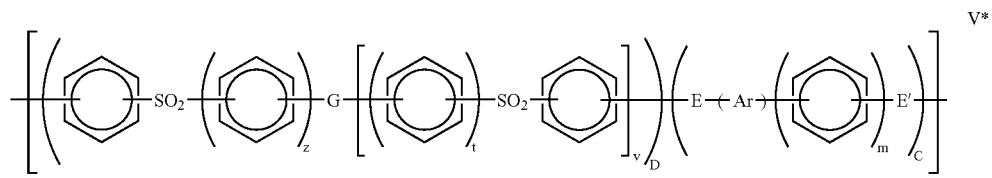

or a random or block copolymer of at least two different units of IV, IV*, V and/or V* provided that repeat units (or parts of repeat unit) are functionalised to provide ion-exchange sites;

wherein A, B, C and D independently represent 0 or 1 and E, E', G, Ar, m, r, s, t, v, w, and z E' independently represent an oxygen or a sulphur atom or a direct link, G represents an oxygen or sulphur atom, a direct link or a —O—Ph—O— moiety where Ph represents a phenyl group and Ar is selected from one of the following moieties (i)* or (i) to (x) which is bonded via one or more of its phenyl moieties to adjacent moieties.

13. A method according to claim 1, wherein said first ion-conducting polymeric material includes a first crystalline or crystallisable unit which is of general formula IV, IV*, V or V* as defined above, provided said unit is crystalline or crystallisable; and a second ion-exchange unit of formula IV, V, IV* or V* as defined above, which includes ion-exchange sites.

14. A method according to claim 13, wherein said first crystalline or crystallisable unit includes a repeat unit of formula

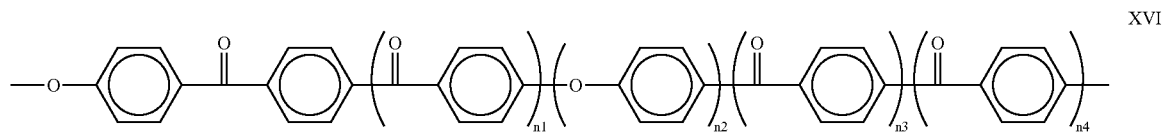

XVI wherein n1, n2, n3 and n4 independently represent 0 or 1 provided that the sum of n1, n2, n3 and n4 is at least 2 and that when n2 is 1 at least one of n3 and n4 is 1.

15. A method according to claim 13, wherein said second ion-conducting unit is of formula

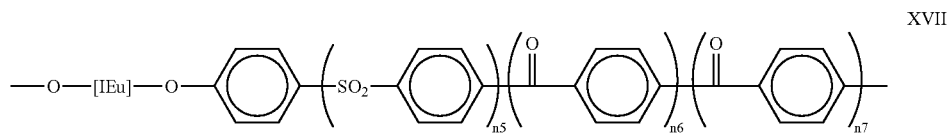

XVII wherein IEU refers to a unit which incorporates ion-exchange sites and $n^5$, $n^6$ and $n^7$ represent 0 or 1 provided that the sum of $n^5$, $n^6$ and $n^7$ is at least 1.

16. A method according to claim 1, wherein said first polymeric material includes at least some ketone moieties in the polymeric chain.

17. A method according to claim 1, wherein the equivalent weight (EW) of said ion-conductive polymeric material is less than 850 g/mol and is greater than 300 g/mol.

18. A method according to claim 2, wherein the ratio of the volume of said first solvent part to the volume of said second solvent part in said solvent formulation is in the range 0.2 to 5.

19. A method of preparing a membrane electrode assembly, the method including associating a catalyst material with a polymeric material prepared in a method according to claim 1.

* * * * *